United States Patent
Robison et al.

(10) Patent No.: US 10,863,035 B2
(45) Date of Patent: Dec. 8, 2020

(54) MICROPHONE ASSEMBLY FOR ECHO REJECTION IN AUDIO ENDPOINTS

(71) Applicant: Cisco Technology, Inc., San Jose, CA (US)

(72) Inventors: David William Nolan Robison, Campbell, CA (US); Kevin Lee Hughes, Frisco, TX (US); Feng Bao, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 15/827,457

(22) Filed: Nov. 30, 2017

(65) Prior Publication Data

US 2019/0166257 A1    May 30, 2019

(51) Int. Cl.
*H04M 9/08* (2006.01)
*G10L 21/0208* (2013.01)
(Continued)

(52) U.S. Cl.
CPC ......... *H04M 9/082* (2013.01); *G10L 21/0208* (2013.01); *H04R 1/083* (2013.01);
(Continued)

(58) Field of Classification Search
CPC .... H04R 1/026; H04R 1/2846; H04R 1/2892; H04R 1/323; H04R 1/406; H04R 19/016;
(Continued)

(56) References Cited

U.S. PATENT DOCUMENTS 6,072,522 A    6/2000  Ippolito et al.
7,366,310 B2 * 4/2008  Stinson .................. H04R 1/406
                                                          381/122
(Continued)

FOREIGN PATENT DOCUMENTS

EP    0297975 B1    1/1989

OTHER PUBLICATIONS

Holger Stoltze, "Revolabs FLX™—The Conference Phone, Evolved", Revolabs, Inc., www.revolabs.com, Feb. 9, 2012, 15 pgs.

*Primary Examiner* — Lisa Hashem
(74) *Attorney, Agent, or Firm* — Edell, Shapiro & Finnan, LLC

(57) ABSTRACT

Presented herein is an audio endpoint for telecommunication operations with increased echo rejection. According to one example, the audio endpoint includes a housing body, an upper speaker assembly, a lower speaker assembly, and at least one microphone assembly. The upper speaker assembly is disposed near a top portion of the housing body and has an effective frequency range above a first frequency. The lower speaker assembly is disposed near a bottom portion of the housing body and has an effective frequency range below a second frequency. The microphone assembly includes a first microphone element and a second microphone element. The first microphone element is above the second microphone element so that they are vertically aligned. The first microphone element has an effective frequency range below the first frequency and the second microphone element has an effective frequency range above the second frequency.

20 Claims, 6 Drawing Sheets

(51) Int. Cl.
*H04R 1/22* (2006.01)
*H04R 1/28* (2006.01)
*H04R 1/08* (2006.01)
*H04R 3/02* (2006.01)
*H04R 3/00* (2006.01)
*H04R 27/00* (2006.01)

(52) U.S. Cl.
CPC ........... *H04R 1/222* (2013.01); *H04R 1/2873* (2013.01); *H04R 3/02* (2013.01); *G10L 2021/02082* (2013.01); *H04R 3/005* (2013.01); *H04R 27/00* (2013.01)

(58) Field of Classification Search
CPC .. H04R 27/00; H04R 3/005; H04R 2201/401; H04R 1/222; H04R 1/2873; H04R 1/083; H04R 3/02; H04M 9/082; G10L 21/0208; G10L 2021/02082
See application file for complete search history.

(56) References Cited

U.S. PATENT DOCUMENTS

| | | | |
|---|---|---|---|
| 7,519,175 B2 | 4/2009 | Suzuki et al. | |
| 7,925,004 B2 | 4/2011 | Hodges et al. | |
| 8,050,432 B2 | 11/2011 | De Klerk | |
| 8,111,838 B2 | 2/2012 | Tokuda et al. | |
| 8,817,971 B2 | 8/2014 | Shida et al. | |
| 9,113,243 B2 | 8/2015 | Nielsen et al. | |
| 9,113,264 B2 | 8/2015 | Frater | |
| 9,271,069 B2 | 2/2016 | Hartung et al. | |
| 10,051,353 B2 * | 8/2018 | Robison | H04R 1/2857 |
| 2003/0059061 A1 * | 3/2003 | Tsuji | H04M 3/569 381/92 |
| 2004/0131201 A1 * | 7/2004 | Hundal | H04M 9/082 381/77 |
| 2005/0285935 A1 * | 12/2005 | Hodges | H04M 9/082 348/14.08 |
| 2005/0286698 A1 * | 12/2005 | Bathurst | H04M 1/6033 379/202.01 |
| 2007/0064925 A1 * | 3/2007 | Suzuki | H04R 3/005 379/420.01 |
| 2011/0194719 A1 | 8/2011 | Frater | |
| 2013/0002797 A1 * | 1/2013 | Thapa | H04M 3/002 348/14.01 |
| 2013/0155173 A1 * | 6/2013 | Brady | H04N 7/15 348/14.03 |
| 2014/0139615 A1 * | 5/2014 | Graham | H04R 3/005 348/14.08 |
| 2015/0304765 A1 | 10/2015 | Nielsen et al. | |
| 2016/0101499 A1 | 4/2016 | Sventek et al. | |
| 2017/0186441 A1 * | 6/2017 | Wenus | H04N 5/33 |

* cited by examiner

MICROPHONE ASSEMBLY FOR ECHO REJECTION IN AUDIO ENDPOINTS

TECHNICAL FIELD

The present disclosure relates to telecommunications audio endpoints.

BACKGROUND

Audio endpoints, such as conference phones, electronic personal/home assistants, hands-free/smart speakers (i.e., speakers with voice controls), and other devices that include a speaker and one or more microphone(s) are becoming smaller in size. As a result, the distance between speaker(s) and microphone(s) in the audio endpoint is reduced. The closer the distance between the speaker(s) and microphone(s), the higher the acoustic coupling between them and the greater the amount of echo caused by sound from the speaker(s) picked up by the microphone(s).

DESCRIPTION OF EXAMPLE EMBODIMENTS

Overview

Figure 1:
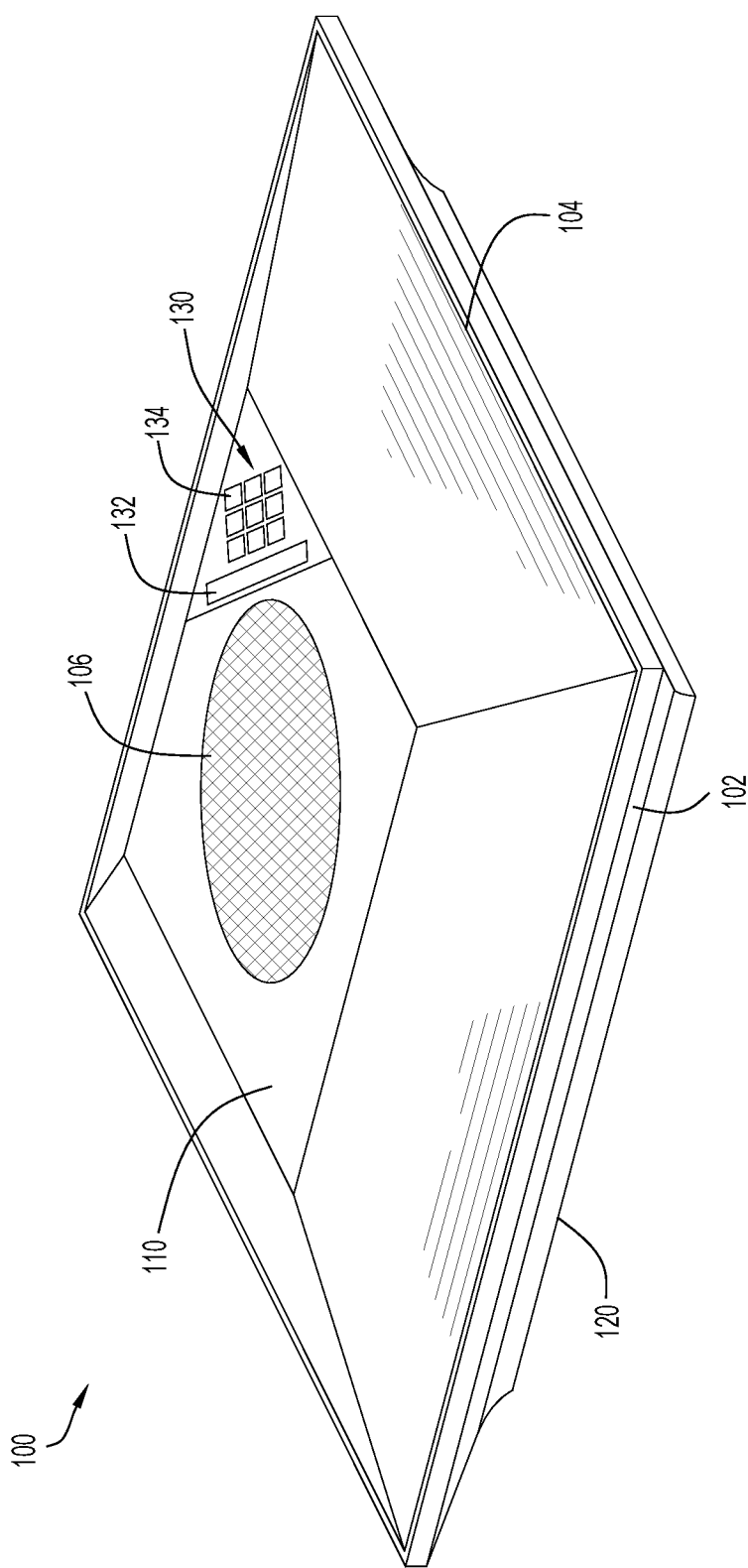
FIG. 1 is a perspective view of an audio endpoint according to an example embodiment.

Presented herein is an audio endpoint for telecommunication operations, sometimes referred to herein as a "telecommunications audio endpoint" or, more simply, as an "audio endpoint." According to one example embodiment, the audio endpoint includes a housing body, an upper speaker assembly, a lower speaker assembly, and at least one microphone assembly. The housing body includes a top portion and a bottom portion located opposite the top portion. The upper speaker assembly is disposed near the top portion of the housing body and the upper speaker assembly has an effective frequency range above a first frequency. The lower speaker assembly is disposed near the bottom portion of the housing body and the lower speaker assembly has an effective frequency range below a second frequency. The at least one microphone assembly is positioned on or in the housing body. The microphone assembly includes a first microphone element and a second microphone element. The first microphone element is disposed above the second microphone element so that the first microphone element and the second microphone element are vertically aligned. The first microphone element has an effective frequency range below the first frequency. The second microphone element has an effective frequency range above the second frequency.

According to another example embodiment, an audio endpoint includes a first paired microphone and speaker and a second paired microphone and speaker. The first paired microphone and speaker includes at least one first microphone element having an effective frequency range below a first frequency and at least one first speaker assembly having an effective frequency range above the first frequency. The second paired microphone and speaker includes at least one second microphone element having an effective frequency range above a second frequency and at least one second speaker assembly having an effective frequency range below the second frequency.

In still further example embodiments, a microphone assembly for an audio endpoint is presented herein. The microphone assembly includes a first microphone element and a second microphone element. The first microphone element is a uni-directional microphone with a sensitivity orientation in a first direction. The second microphone element is a uni-directional microphone with a sensitivity orientation in the first direction. The first microphone element is disposed above, and vertically aligned with, the second microphone element. Additionally, the first microphone element and second microphone element are separated by a first distance. The first microphone element has a first aperture size. The second microphone element has a second aperture size. The first aperture size is larger than the second aperture size.

Example Embodiments

In an audio endpoint, when the microphone(s) and speaker are separated vertically, combing effects (due to harmonic cancellations) may significantly reduce the sound quality of the speaker and/or prevent the microphone(s) from picking up at least some sound. Consequently, devices with vertical separation between the speaker and the microphone(s) (i.e., electronic personal assistants) may not meet telecommunication standards. That is, devices with vertical separation between the speaker and the microphone(s) may be unacceptable for telecommunication purposes, even if these devices are still acceptable for personal/home assistant purposes. In some instances, devices with vertical separation may implement acoustic echo canceling ("AEC") algorithms in an attempt to achieve acceptable echo quality. However, these algorithms may not be effective in all conditions. For example, some AEC algorithms require low distortion and low sound pressure levels to be received by the microphone(s) in order to provide full-duplex communication.

By comparison, horizontal separation between microphone(s) and a speaker typically prevents (or diminishes) the impact of acoustic coupling between the speaker and the microphone(s) and allows an audio device to operate within parameters specified by telecommunication standards. Consequently, audio endpoints for telecommunication operations (i.e., conference phones) typically provide horizontal separation between a speaker and the microphone(s). For example, some conference phones provide approximately 15 cm of horizontal separation between a speaker and a microphone. However, this horizontal separation creates a large horizontal footprint, causing many conference phones to have a footprint that is significantly larger than desktop phones or other such audio devices (i.e., traditional conference phones are 20-30 cm in diameter).

Presented herein are embodiments of a microphone assembly and an audio endpoint configured to provide increased echo rejection for audio endpoints suitable for telecommunication operations. In audio endpoints used for telecommunication operations (e.g., conference phones), as the sound pressure level of a speaker increases, the echo sound pressure level experienced by a microphone becomes too high for traditional echo cancellation techniques. Resulting echo suppression can cause half-duplex communications and/or audible artifacts. The embodiments presented herein provide a microphone assembly and audio endpoint with vertically-aligned microphones to assist with increased echo rejection to allow for full-duplex communication at maximum playback volume.

Now turning to the figures, it is to be understood that terms such as "left," "right," "top," "bottom," "front," "rear," "side," "height," "length," "width," "upper," "lower," "interior," "exterior," "inner," "outer," "forward," "rearward," "upwards," "downwards," and the like as may be used herein, merely describe points or portions of reference and do not limit the examples presented to any particular orientation or configuration. Further, terms such as "first," "second," "third," etc., merely identify one of a number of portions, components and/or points of reference as disclosed herein, and do not limit the examples presented herein to any particular configuration or orientation.

Referring first to FIG. 1, an example embodiment of an audio endpoint 100 configured in accordance with the principles described herein is illustrated. In this embodiment, the audio endpoint 100 includes a housing body 102 with an approximately quadrilateral shape defined by a perimeter 104. The housing body 102 of audio endpoint 100 includes a top portion 110 and a bottom portion 120. A sound-permeable cover or shell 106 may be disposed on top portion 110 of housing body 102, for example, to cover various components of audio endpoint 100. For clarity, cover 106 may be omitted from the remaining diagrams.

Additionally, other components of audio endpoint 100 may be disposed on top portion 110. For example, a user interface 130 may be included on top portion 110 of audio endpoint 100. User interface 130 may be provided to allow a user to control the audio endpoint 100 and provide information to the user. In an example embodiment, user interface 130 may include a display 132 configured to provide information to the user and one or more input devices, such as a keypad 134. It should be understood that user interface 130 may also include additional components, including volume controls, power switches, and other selection or input devices.

Bottom portion 120 of housing body 102 is generally configured to support the audio endpoint 100 on a support surface, such as a table or desk. However, in different scenarios, the audio endpoint 100 might be configured for different arrangements, for example, inverted or sidewise (i.e., hung from a ceiling or mounted to a wall). In these scenarios, the bottom portion 120 would still engage a support surface so that the support surface is under or beneath the audio endpoint 100.

Figure 2:
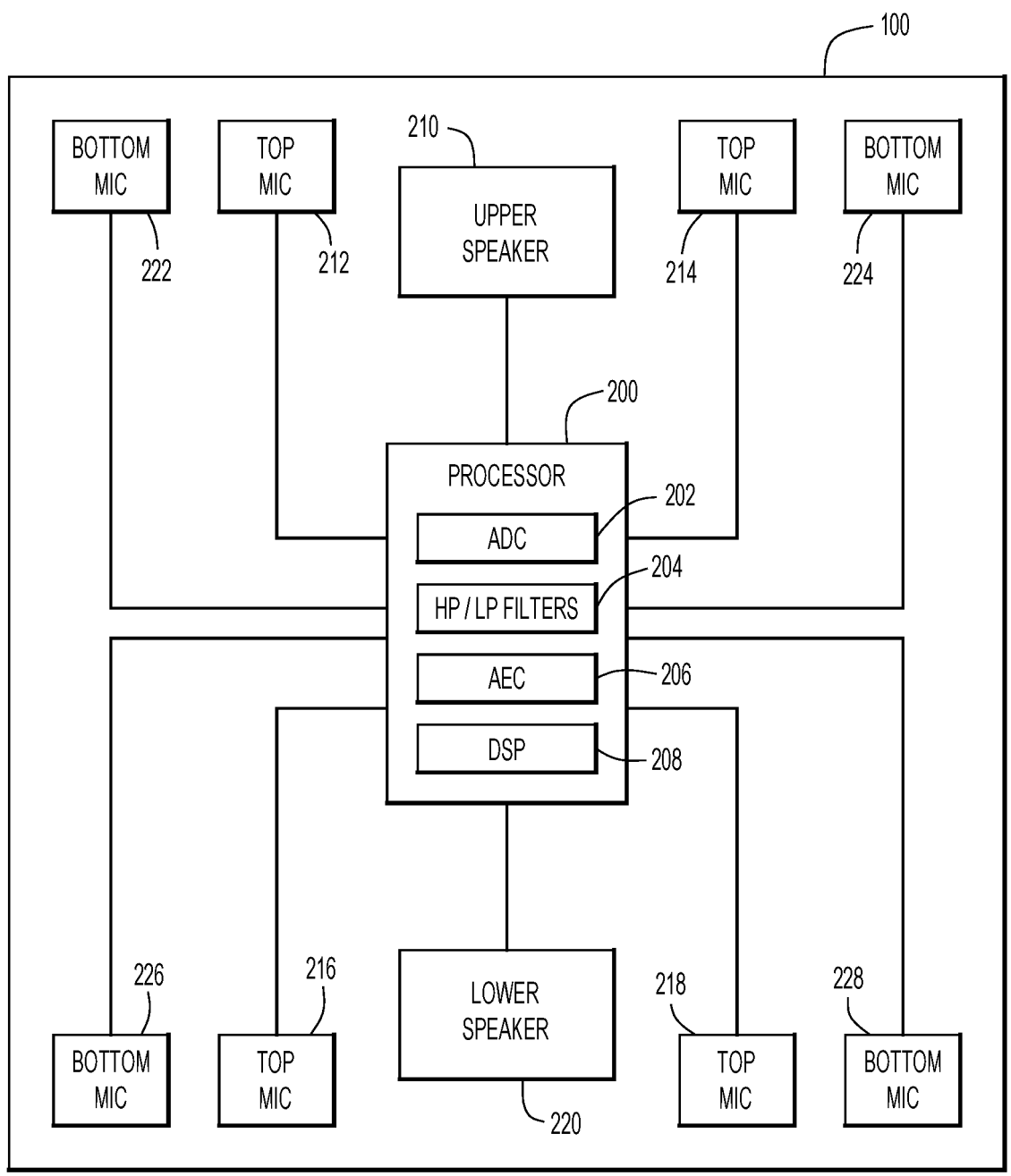
FIG. 2 is a block diagram illustrating an electrical block diagram of the audio endpoint, according to an example embodiment.

FIG. 2 is an electrical block diagram of audio endpoint 100, according to an example embodiment. Audio endpoint 100 includes a processor 200 configured to provide audio signal processing and other functions related to operation of audio endpoint 100. Processor 200 may include one or more functions of an analog/digital convertor (ADC) 202, one or more high-pass and/or low-pass filters 204, an acoustic echo cancellation (AEC) module 206, a digital signal processor (DSP) 208, as well as other components configured to allow operation of audio endpoint 100. It should be understood that one or more functions of processor 200, including ADC 202, high-pass/low-pass filters 204, AEC 206, DSP 208, or other components, may be configured in separate hardware, software, or a combination of both. Additionally, processor 200 may include a plurality of processors.

The audio endpoint 100 further includes an upper speaker assembly 210, a lower speaker assembly 220, and a plurality of microphone assemblies, including microphone elements 212, 214, 216, 218, 222, 224, 226, and 228. With reference to FIG. 1, in an example embodiment, audio endpoint 100 includes upper speaker assembly 210 disposed at or near top portion 110 of housing body 102. Upper speaker assembly 210 may be a full-range speaker that is configured to reproduce higher frequencies, for example, frequencies in the range of approximately 500 Hz-24 kHz. Upper speaker assembly 210 is disposed at or near top portion 110 of housing body 102 of audio endpoint 100 so that it fires in an upwards direction. In other words, sound reproduced by upper speaker assembly 210 is directed outwards and away from top portion 110 of housing body 102.

In an example embodiment, audio endpoint 100 further includes lower speaker assembly 220 disposed at or near bottom portion 120 of housing body 102. Lower speaker assembly 220 may be a woofer that is configured to reproduce lower frequencies, for example, frequencies in the range of approximately 80 Hz-500 Hz. Lower speaker assembly 220 is disposed at or near bottom portion 120 of housing body 102 of audio endpoint 100 so that it fires in a downwards direction. In other words, sound reproduced by lower speaker assembly 220 is directed downwards and away from bottom portion 120 of housing body 102, i.e., towards the support surface on which audio endpoint 100 is disposed.

Audio endpoint 100 may also include a plurality of microphone assemblies. Each of the microphone assemblies includes at least two stacked, vertically-aligned microphone elements. For example, a top microphone element disposed at or near top portion 110 of housing body 102 of audio endpoint 100 and a bottom microphone element disposed at or near bottom portion 120 of housing body 102 of audio endpoint 100. In the example embodiments described herein, the top microphone element is disposed above the bottom microphone element so that top microphone element and the bottom microphone element are vertically-aligned. In one example embodiment, audio endpoint 100 includes a first microphone assembly including a first top microphone element 212 and a first bottom microphone element 222, a second microphone assembly including a second top microphone element 214 and a second bottom microphone element 224, a third microphone assembly including a third top microphone element 216 and a third bottom microphone element 226, and a fourth microphone assembly including a fourth top microphone element 218 and a fourth bottom microphone element 228.

In an example embodiment, each of the microphone elements 212, 214, 216, 218, 222, 224, 226, and 228 may be a uni-directional electret condenser microphone (ECM). The uni-directional ECMs may be configured with a sensitivity orientation of a polar response lobe oriented in a particular direction. For example, in the case of the vertically-aligned microphone assemblies described above, each top microphone element 212, 214, 216, 218 may be vertically disposed over a corresponding bottom microphone element 222, 224, 226, 228 with sensitivity orientations of the microphone elements configured in the same direction. With this arrangement, the corresponding top microphone elements 212, 214, 216, 218 are time-aligned with their corresponding bottom microphone element 222, 224, 226, 228 to avoid phase cancellations.

In an example embodiment, the microphone assemblies are laterally spaced apart from the location of the speaker assemblies on the housing body 102 of audio endpoint. For example, upper speaker assembly 210 and lower speaker assembly 220 may be approximately centrally disposed in the middle of housing body 102 of audio endpoint 100. Each microphone assembly may then be arranged at or near portions of perimeter 104 of housing body 102 to be laterally spaced apart from the speaker assemblies. In one example embodiment, a microphone assembly, including a vertically-stacked top microphone element and bottom microphone element, is arranged at each corner of the four corners of the quadrilateral shaped housing body 102 of audio endpoint 100. Additionally, the sensitivity orientations of the individual microphone elements 212, 214, 216, 218, 222, 224, 226, and 228 are arranged relative to housing body 102 of audio endpoint 100 so that the null faces towards the speakers, e.g., upper speaker assembly 210 and lower speaker assembly 220. With this arrangement, the polar response lobes of the microphone elements 212, 214, 216, 218, 222, 224, 226, and 228 are oriented facing outwards from housing body 102 of audio endpoint 100, i.e., facing away from the center of audio endpoint 100 and in a direction oriented outwards from perimeter 104 of housing body 102.

In example embodiments, audio endpoint 100 includes four microphone assemblies, each including at least two microphone elements. In other embodiments, audio endpoint 100 may include any number of microphone assemblies and/or microphone elements. For example, each microphone element of the plurality of microphone assemblies may be provided by microphone arrays comprised of multiple individual microphone elements.

Figure 3:
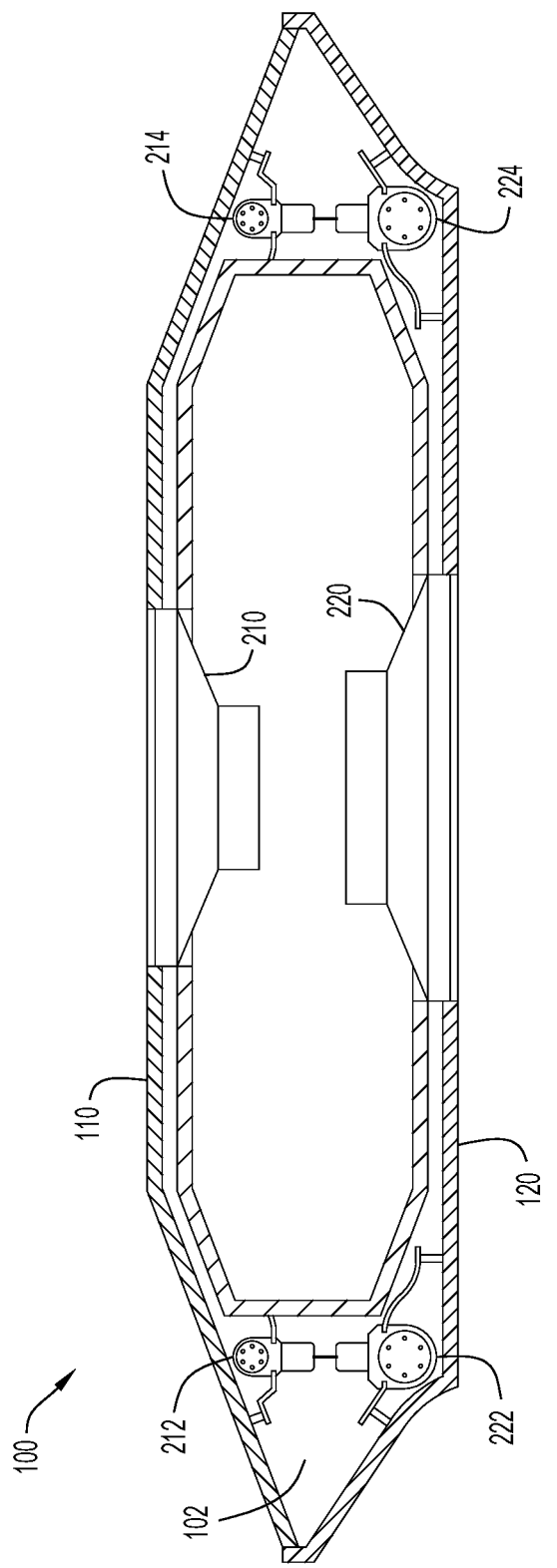
FIG. 3 is a diagram illustrating a side cross-sectional view of the audio endpoint of FIG. 1.

Referring now to FIG. 3, a cross-sectional view of audio endpoint 100 is shown. The view illustrated in FIG. 3 will aid description of the relationship between placement of the microphone assemblies and the speaker assemblies within the housing body 102 of audio endpoint 100 according to the principles described herein to provide increased echo rejection.

In this example embodiment, audio endpoint 100 includes upper speaker assembly 210 disposed at or near top portion 110 of housing body 102. Audio endpoint 100 also includes first top microphone element 212 and second top microphone element 214 disposed at or near top portion 110 of housing body 102 and spaced apart laterally from upper speaker assembly 210. Audio endpoint 100 further includes lower speaker assembly 220 disposed at or near bottom portion 120 of housing body 102, opposite upper speaker assembly 210. Lower speaker assembly 220 is vertically aligned beneath upper speaker assembly 210 to provide time-alignment. Audio endpoint 100 also includes first bottom microphone element 222 and second bottom microphone element 224 disposed at or near bottom portion 120 of housing body 102 and spaced apart laterally from lower speaker assembly 220.

As shown in FIG. 3, first top microphone element 212 is disposed above first bottom microphone element 222 and second top microphone element 214 is disposed above second bottom microphone element 224. As previously described, top microphone elements 212, 214 may be vertically-stacked and time-aligned with corresponding bottom microphone elements 222, 224. In addition, corresponding top and bottom uni-directional microphone elements (e.g., microphone elements 212, 222 and microphone elements 214, 224) may have sensitivity directions oriented in the same direction. Taken together, therefore, first top microphone element 212 and first bottom microphone element 222 may form a first microphone assembly and second top microphone element 214 and second bottom microphone element 224 may form a second microphone assembly.

FIG. 3 shows a cross-sectional view of an example embodiment of audio endpoint 100 that includes at least two microphone assemblies. It should be understood that embodiments having additional microphone assemblies, for example, the embodiment described above having a microphone assembly at each of the four corners of a quadrilateral-shaped housing body 102, may have a substantially similar configuration for each of the microphone assemblies.

In the example embodiments, audio endpoint 100 has a two-way acoustic architecture with upper speaker assembly 210 configured to provide a full-range of frequencies and fire in an upwards direction and lower speaker assembly 220 configured to provide a low range frequencies and fire in a downwards direction. Conventionally, an audio endpoint having this two-way acoustic architecture may experience two types of problems. The first problem relates to placement of uni-directional microphones on top of the audio endpoint introducing "combing-effects" or notches in the frequency response at every octave starting at the frequency corresponding to the difference between direct and reflected energy. This difference creates phase cancellations and decreases microphone fidelity, making enunciation of certain letters and/or sounds difficult to understand. The second problem relates to placement of uni-directional microphones at the bottom of the audio endpoint capturing a significant amount of echo energy at low frequencies. This is primarily due to the proximity effect of having a microphone near the bottom that is close to a downward firing woofer significantly increasing low-frequency echo energy (e.g., frequencies less than 500 Hz). Typical echo cancellation techniques are only effective for a finite amount of linear echo energy and the remaining echo energy is suppressed. The result of this suppression is a reduction of speaker playback level during full-duplex communications, half-duplex communications, and/or audible artifacts.

The example embodiments described herein provide a microphone assembly and audio endpoint with increased echo rejection to allow for full-duplex communication at maximum playback volume, as will be further described in reference to FIGS. 4-6 below.

Figure 4:
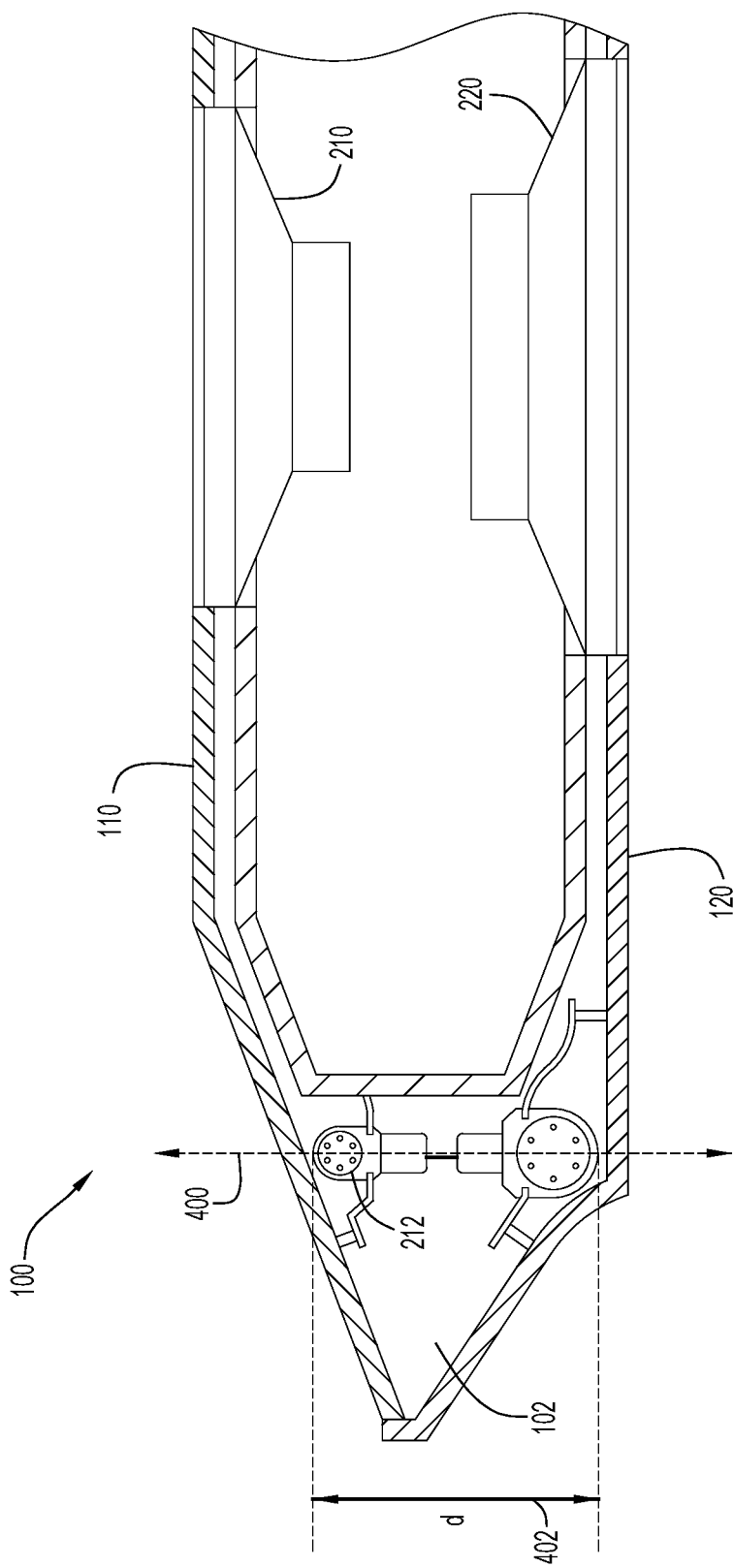
FIG. 4 is a diagram illustrating an enlarged cross-sectional view of a microphone assembly in the audio endpoint of FIG. 1.
Figure 5:
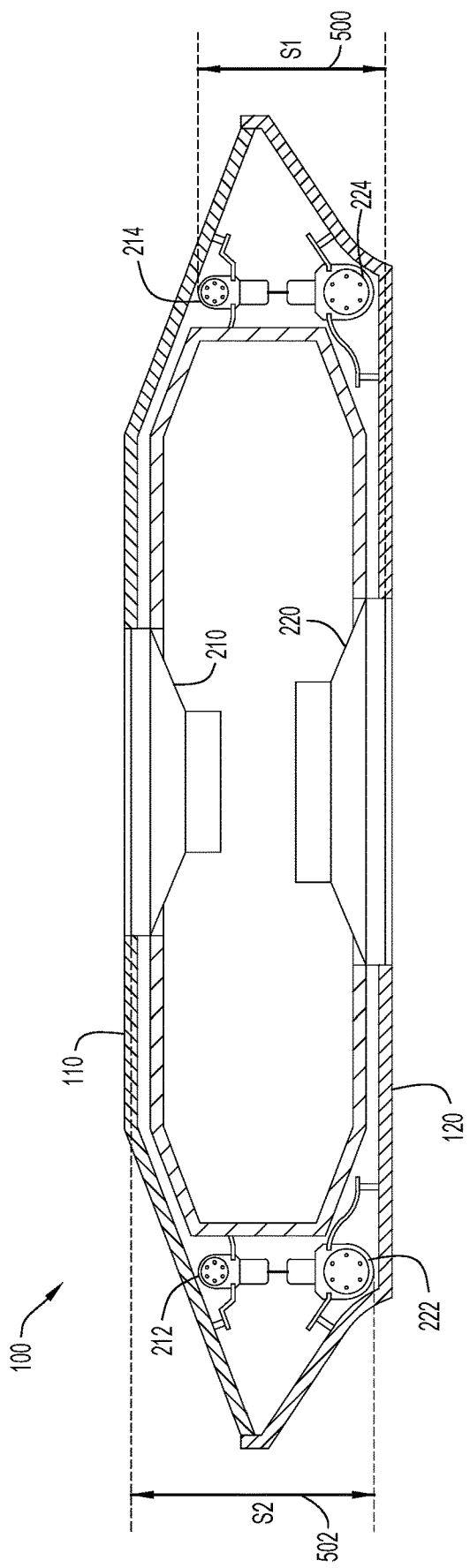
FIG. 5 is a diagram illustrating a side cross-sectional view showing the separation distances between speaker assemblies and microphone elements in the audio endpoint of FIG. 1, according to an example embodiment.

Referring now to FIG. 4, an enlarged cross-sectional view of a portion of audio endpoint 100 is shown to illustrate the relationship between a top microphone element and a bottom microphone element in a microphone assembly. In this example, the first microphone assembly of audio endpoint 100, including first top microphone element 212 and first bottom microphone element 222, is shown. As previously described, first top microphone element 212 is disposed above first bottom microphone element 222 so that the microphone elements are vertically-aligned along axis 400. In this embodiment, axis 400 is oriented in the vertical direction between bottom portion 120 and top portion 110. In other embodiments where audio endpoint is configured with a different arrangement, axis 400 may be oriented in another direction.

In an example embodiment, first top microphone element 212 and first bottom microphone element 222 are configured with different sized apertures. For example, first top microphone element 212 may have an aperture size of approximately 10 mm and first bottom microphone element 222 may have an aperture size of approximately 6 mm. By providing first bottom microphone element 222 with a smaller aperture size than first top microphone element 212, first bottom microphone element 222 will have a higher frequency extension and a steeper roll-off at low frequency. This low frequency roll-off of the smaller aperture size of first bottom microphone 222 provides an amount of natural low-frequency rejection due to frequency attenuation due to the geometry/structure of the smaller aperture. Similarly, by providing first top microphone element 212 with a larger aperture size, signal-to-noise ratio may be improved and low frequency roll-off is more gentle, i.e., less steep than first bottom microphone element 222.

It should be understood that aperture sizes of 10 mm for first top microphone element 212 and 6 mm for first bottom microphone element 222 are examples. Different sized apertures may be used in other embodiments, while maintaining a relative aperture size difference between top and bottom microphone elements such that the aperture size of the bottom microphone element is smaller than the aperture size top microphone element.

As shown in FIG. 4, the first microphone assembly can include first top microphone element 212 separated from first bottom microphone element 222 by a distance d 402. The distance d may be within a range less than or equal to approximately 12 inches. For example, at approximately the maximum 12 inches of separation between first top microphone element 212 and first bottom microphone element 222, first top microphone element 212 will have an approximately 1 kHz combing frequency. In one example embodiment, distance d 402 is approximately 35 mm. It should be understood that distance d between top and bottom microphone elements in a microphone assembly may be larger or smaller. For example, the distance d may be determined based on expected performance parameters of an audio endpoint and/or may be based on geometric or structural architecture of an audio endpoint.

In an example embodiment, audio endpoint 100 may include a plurality of paired microphone and speaker arrangements. Each paired microphone and speaker may be configured with effective frequency ranges that are complementary to each other. In other words, one of the microphone and speaker will have an effective frequency at or above a predetermined frequency and the other one will have an effective frequency at or below the predetermined frequency. For example, referring to audio endpoint 100 shown in FIG. 4, first top microphone element 212 and upper speaker assembly 210 may be arranged as a first paired microphone and speaker. In this embodiment, first top microphone element 212 may have an effective frequency range below a first frequency, while upper speaker assembly 210 has an effective frequency range above the first frequency. In one example embodiment, the first frequency may be approximately 500 Hz. With this arrangement between the first paired microphone and speaker, coupling in audio endpoint 100 may be decreased.

First bottom microphone element 222 and lower speaker assembly 220 may be arranged as a second paired microphone and speaker. In this embodiment, first bottom microphone element 222 may have an effective frequency range above a second frequency, while lower speaker assembly 220 may have an effective frequency range below the second frequency. In one example embodiment, the second frequency may be approximately 500 Hz. With this arrangement between the second paired microphone and speaker, coupling in audio endpoint 100 may be decreased.

In some example embodiments, a paired microphone and speaker may include multiple microphone elements. FIG. 5 shows a side cross-sectional view of audio endpoint 100 including speaker assemblies 210, 220 and a plurality of microphone elements 212, 214, 222, 224. As previously described, upper speaker assembly 210 may be configured with an effective frequency range above a predetermined frequency. For example, upper speaker assembly 210 may be a full-range speaker that is configured to reproduce higher frequencies in the range of approximately 500 Hz-24 kHz. Upper speaker assembly 210 may be further associated with a high-pass filter configured to filter out frequencies below a first frequency. For example, upper speaker assembly 210 may be associated with a high-pass filter that filters out frequencies below 500 Hz.

Conversely, first top microphone element 212 and second top microphone element 214 may be associated with a low-pass filter configured to filter out frequencies above the first frequency. For example, first top microphone element 212 and second top microphone element 214 may be associated with a low-pass filter that filters out frequencies above 500 Hz. That is, on top portion 110 of audio endpoint 100, the paired microphone(s) and speaker are configured so that their effective frequency ranges are complementary to each other. In other words, top microphone elements 212, 214 have an effective frequency range below the effective frequency range of the upper speaker assembly 210 so that there is little to no overlap between the effective frequency ranges of the microphone elements 212, 214 and upper speaker assembly 210 on the top portion 110 of audio endpoint 100.

Similarly, the paired microphone(s) and speaker disposed at bottom portion 120 may also be arranged to avoid overlap between the effective frequency ranges of bottom microphone elements 222, 224 and lower speaker assembly 220. As previously described, lower speaker assembly 220 may be configured with an effective frequency range below a predetermined frequency. For example, lower speaker assembly 220 may be a woofer that is configured to reproduce lower frequencies in the range of approximately 80 Hz-500 Hz. Lower speaker assembly 220 may be further associated with a low-pass filter configured to filter out frequencies above a second frequency. For example, lower speaker assembly 220 may be associated with a low-pass filter that filters out frequencies above 500 Hz.

First bottom microphone element 222 and second bottom microphone element 224 may be associated with a high-pass filter configured to filter out frequencies below the second frequency. For example, first bottom microphone element 222 and second bottom microphone element 224 may be associated with a high-pass filter that filters out frequencies below 500 Hz. Therefore, on bottom portion 120 of audio endpoint 100, the paired microphone(s) and speaker are configured so that their effective frequency ranges are complementary to each other. With this arrangement, bottom microphone elements 222, 224 have an effective frequency range above the effective frequency range of the lower speaker assembly 220 so that there is little to no overlap between the effective frequency ranges of the microphone elements 222, 224 and lower speaker assembly 220 on the bottom portion 120 of audio endpoint 100.

It should be understood that, in some embodiments, additional top microphone elements disposed on top portion 110 of housing body 102 of audio endpoint 100 may be substantially similar to top microphone elements 212, 214. For example, in the example embodiment including four vertically-stacked top and bottom microphone elements, each top microphone element 212, 214, 216, 218 may have an effective frequency range that is complementary to upper speaker assembly 210 and each bottom microphone element 222, 224, 226, 228 may have an effective frequency range that is complementary to lower speaker assembly 220.

In the present example embodiments, the high-pass filters and low-pass filters are set at approximately 500 Hz. However, in other embodiments, the frequencies of the high-pas filters and/or low-pass filters may be higher or lower. For example, high-pass filters may be provided to filter out frequencies below 1 kHz, 2 kHz, or any other set frequency and low-pass filters may be provided to filter our frequencies above 1 kHz, 2 kHz, or any other set frequency.

Referring again to FIG. 5, the relative separation distances between speaker assemblies and microphone elements having similar effective frequency ranges is illustrated. In this embodiment, the top microphone elements (e.g., first top microphone element 212 and second top microphone element 214) have a similar effective frequency range as lower speaker assembly 220 disposed at or near bottom portion 120 of housing body 102. Top microphone elements 212, 214 are spaced apart from lower speaker assembly 220 by a first separation distance (S1) 500.

In this embodiment, the upper speaker assembly 210 disposed at or near top portion 110 of housing body 102 has a similar effective frequency range as the bottom microphone elements (e.g., first bottom microphone element 222 and second bottom microphone element 224) disposed at or near bottom portion 120 of housing body 102. Upper speaker 210 is spaced apart from bottom microphone elements 222, 224 by a second separation distance (S2) 502. Accordingly, speaker assemblies and microphone elements with the same effective frequencies are located on opposite top and bottom portions of audio endpoint 100. With this arrangement, audio endpoint 100 may experience improved echo rejection during telecommunications operations.

Figure 6:
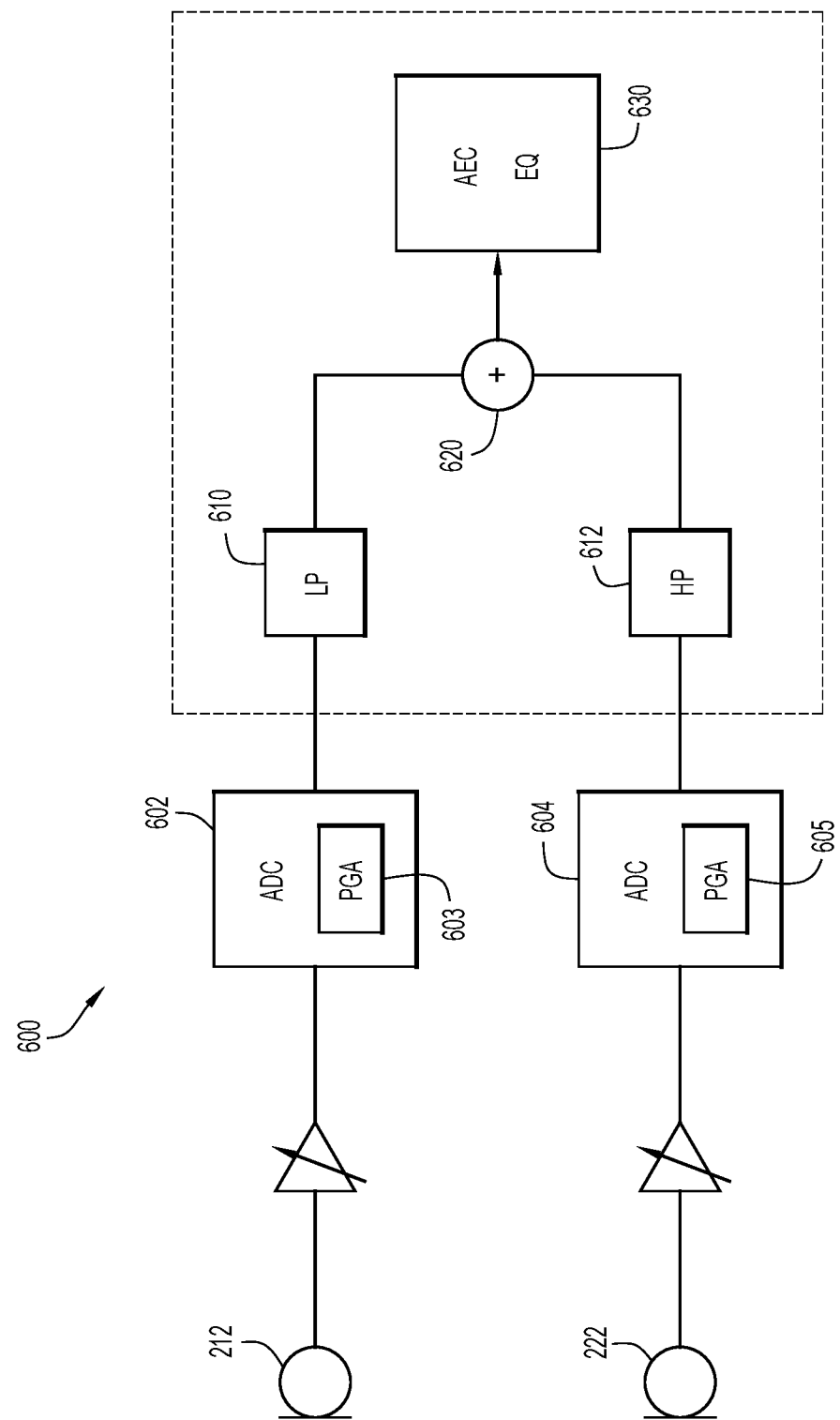
FIG. 6 is a diagram illustrating an echo cancellation circuit for a microphone assembly of an audio endpoint, according to an example embodiment.

FIG. 6 illustrates an echo cancellation circuit 600 for a representative microphone assembly of audio endpoint 100, according to an example embodiment. In this embodiment, the representative microphone assembly includes vertically-stacked and time-aligned first top microphone element 212 and first bottom microphone element 222. Echo cancellation circuit 600 includes a first analog-digital converter (ADC) 602, a first programmable gain amplifier (PGA) 603, a second analog-digital converter (ADC) 604, a second programmable gain amplifier (PGA) 605, a low-pass (LP) filter 610, a high-pass (HP) filter 612, a digital summing block 620, and an acoustic echo cancellation (AEC) module 630.

In this embodiment, a signal received by first top microphone element 212 is sent to first ADC 602, which may include amplification by first PGA 603. Next, the signal from first top microphone element 212 passes through low-pass filter 610 to filter out frequencies in the signal above a predetermined frequency. For example, as described above, low-pass filter 610 may be configured to filter out signal components having a frequency above 500 Hz.

Also in the this embodiment, a signal received by first bottom microphone element 222 is sent to second ADC 604, which may include amplification by second PGA 605. Next, the signal from first bottom microphone element 222 passes through high-pass filter 612 to filter out frequencies in the signal below a predetermined frequency. For example, as described above, high-pass filter 612 may be configured to filter out signal components having a frequency below 500 Hz.

After the respective signals from first top microphone element 212 and first bottom microphone element 222 have passed through low-pass filter 610 and high-pass filter 612, the signals are then summed together at digital summing block 620. Once the signals have been summed at digital summing block 620, the combined signal may be sent to AEC 630 for acoustic echo cancellation. By summing together the signals from first top microphone element 212 and first bottom microphone element 222 after filtering, the combined signal can be sent to AEC 630 using only a single channel. With this arrangement, processing power required by AEC 630 may be reduced in audio endpoint 100.

It should be understood that FIG. 6 illustrates echo cancellation circuit 600 for a representative microphone assembly that includes one microphone assembly (e.g., vertically-stacked and time-aligned first top microphone element 212 and first bottom microphone element 222). It should be understood that each microphone assembly of the plurality of microphone assemblies may have a substantially similar configuration. For example, the embodiment described above having a microphone assembly at each of the four corners of a quadrilateral-shaped housing body 102 (FIG. 1), may have a substantially similar configuration for each of the microphone assemblies. Each microphone assembly may be associated with a corresponding echo cancellation circuit that is substantially similar to echo cancellation circuit 600. Additionally, AEC 630 may have a corresponding number of channels for each of the microphone assemblies in the audio endpoint. For example, audio endpoint 100 described herein having four microphone assemblies may have AEC 630 having four channels.

In accordance with the principles described herein, the arrangement of microphone assemblies and speaker assemblies provide increased echo rejection for audio endpoints.

The principles of the example embodiments described herein can reduce the coupling sound pressure level from the speakers and microphones in the fundamental frequency range (~300-600 Hz) by ~20 dB and broadband (~20 Hz-20 kHz) echo by greater than 6 dB.

The example embodiments described herein do not require any extra acoustic echo cancellation channels, therefore, CPU power requirements are not increased.

The example embodiments can allow full-duplex communication on an audio endpoint at maximum speaker volume. The microphone assembly and audio endpoint embodiments described herein can provide improved voice quality for telecommunications by reducing microphone/speaker coupling effects.

To summarize, in one form, an audio endpoint is provided comprising: a housing body including a top portion and a bottom portion located opposite the top portion; an upper speaker assembly disposed near the top portion of the housing body, wherein the upper speaker assembly has an effective frequency range above a first frequency; a lower speaker assembly disposed near the bottom portion of the housing body, wherein the lower speaker assembly has an effective frequency range below a second frequency; at least one microphone assembly positioned on or in the housing body, and comprising a first microphone element and a second microphone element, wherein the first microphone element is disposed above the second microphone element so that the first microphone element and the second microphone element are vertically aligned, wherein the first microphone element has an effective frequency range below the first frequency and the second microphone element has an effective frequency range above the second frequency.

In another form, an audio endpoint is provided comprising: a first paired microphone and speaker comprising at least one first microphone element having an effective frequency range below a first frequency and at least one first speaker assembly having an effective frequency range above the first frequency; and a second paired microphone and speaker comprising at least one second microphone element having an effective frequency range above a second frequency and at least one second speaker assembly having an effective frequency range below the second frequency.

In yet another form, a microphone assembly for an audio endpoint is provided comprising: a first microphone element having a first aperture size, the first microphone element comprising a uni-directional microphone with a sensitivity orientation in a first direction; a second microphone element having a second aperture size, the second microphone element comprising a uni-directional microphone with a sensitivity orientation in the first direction; wherein the first microphone element is disposed above, and vertically aligned with, the second microphone element, the first microphone element and second microphone element being separated by a first distance; and wherein the first aperture size is larger than the second aperture size.

Although the techniques are illustrated and described herein as embodied in one or more specific examples, it is nevertheless not intended to be limited to the details shown, since various modifications and structural changes may be made within the scope and range of the embodiments presented herein. In addition, various features from one of the embodiments discussed herein may be incorporated into any other embodiments. Accordingly, the appended claims should be construed broadly and in a manner consistent with the scope of the disclosure.

What is claimed is:

1. An audio endpoint comprising:
a housing body including a top portion and a bottom portion located opposite the top portion;
an upper speaker assembly disposed near the top portion of the housing body, wherein the upper speaker assembly has an effective frequency range above a first frequency;
a lower speaker assembly disposed near the bottom portion of the housing body, wherein the lower speaker assembly has an effective frequency range below a second frequency; and
at least one microphone assembly positioned on or in the housing body, and comprising a first microphone element and a second microphone element, wherein the first microphone element is disposed above the second microphone element so that the first microphone element and the second microphone element are vertically aligned, wherein the first microphone element has an effective frequency range below the first frequency and the second microphone element has an effective frequency range above the second frequency.

2. The audio endpoint of claim 1, further comprising a first high-pass filter associated with the upper speaker assembly, a second high-pass filter associated with the second microphone element, a first low-pass filter associated with the lower speaker assembly, and a second low-pass filter associated with the first microphone element;
wherein the first high-pass filter is configured to filter out frequencies below the first frequency;
wherein the second high-pass filter is configured to filter out frequencies below the second frequency;
wherein the first low-pass filter is configured to filter out frequencies above the second frequency; and
wherein the second low-pass filter is configured to filter out frequencies above the first frequency.

3. The audio endpoint of claim 2, wherein the first frequency is approximately 500 Hz.

4. The audio endpoint of claim 3, wherein the second frequency is approximately 500 Hz.

5. The audio endpoint of claim 1, wherein the first microphone element is vertically separated from the second microphone element by a first distance.

6. The audio endpoint of claim 5, wherein the first distance is less than or equal to 12 inches.

7. The audio endpoint of claim 1, wherein the at least one microphone assembly is arranged in at least one corner of the housing body of the audio endpoint.

8. The audio endpoint of claim 7, wherein the housing body has an approximately quadrilateral shape including four corners; and
wherein the at least one microphone assembly comprises at least one microphone assembly arranged at each of the four corners of the housing body of the audio endpoint.

9. The audio endpoint of claim 1, wherein the first microphone element has a first aperture size;
wherein the second microphone element has a second aperture size; and
wherein the first aperture size is larger than the second aperture size.

10. The audio endpoint of claim 9, wherein the first aperture size is approximately 10 mm and the second aperture size is approximately 6 mm.

11. An audio endpoint comprising:
a first paired microphone and speaker comprising at least one first microphone element having an effective frequency range below a first frequency and at least one first speaker assembly having an effective frequency range above the first frequency; and
a second paired microphone and speaker comprising at least one second microphone element having an effective frequency range above a second frequency and at least one second speaker assembly having an effective frequency range below the second frequency.

12. The audio endpoint of claim 11, further comprising a housing body including a top portion and a bottom portion; and
wherein the first paired microphone and speaker are disposed near the top portion of the housing body; and
wherein the second paired microphone and speaker are disposed near the bottom portion of the housing body.

13. The audio endpoint of claim 11, wherein the first frequency is approximately equal to the second frequency.

14. The audio endpoint of claim 11, wherein the first microphone element is disposed above the second microphone element so that the first microphone element and the second microphone element are vertically aligned.

15. The audio endpoint of claim 11, wherein the at least one first microphone element includes a first low-pass filter configured to filter out frequencies above the first frequency and the at least one first speaker assembly includes a first high-pass filter configured to filter out frequencies below the first frequency; and
wherein the at least one second microphone element includes a second high-pass filter configured to filter our frequencies below the second frequency and the at least one second speaker assembly includes a second low-pass filter configured to filter our frequencies above the second frequency.

16. A microphone assembly for an audio endpoint comprising:

a first microphone element having a first aperture size, the first microphone element comprising a uni-directional microphone with a sensitivity orientation in a first direction;

a second microphone element having a second aperture size, the second microphone element comprising a uni-directional microphone with a sensitivity orientation in the first direction;

wherein the first microphone element is disposed above, and vertically aligned with, the second microphone element, the first microphone element and second microphone element being separated by a first distance; and wherein the first aperture size is larger than the second aperture size.

17. The microphone assembly of claim 16, wherein the first microphone element has a first effective frequency range;

wherein the second microphone element has a second effective frequency range; and wherein the first effective frequency range is complementary to the second effective frequency range.

18. The microphone assembly of claim 16, wherein the first distance between the first microphone element and the second microphone element is less than or equal to 12 inches.

19. The microphone assembly of claim 16, wherein the first microphone element and the second microphone element are arranged in at least one corner of a housing body of an audio endpoint.

20. The microphone assembly of claim 16, wherein the first aperture size is approximately 10 mm and the second aperture size is approximately 6 mm.

* * * * *